Jan. 9, 1968  P. B. BURRUS ET AL  3,362,560

REFRIGERATING APPARATUS

Filed July 12, 1965  2 Sheets-Sheet 1

INVENTORS
Paul B. Burrus
John C. Rill, Jr.
BY
Carl A. Stickel
THEIR ATTORNEY

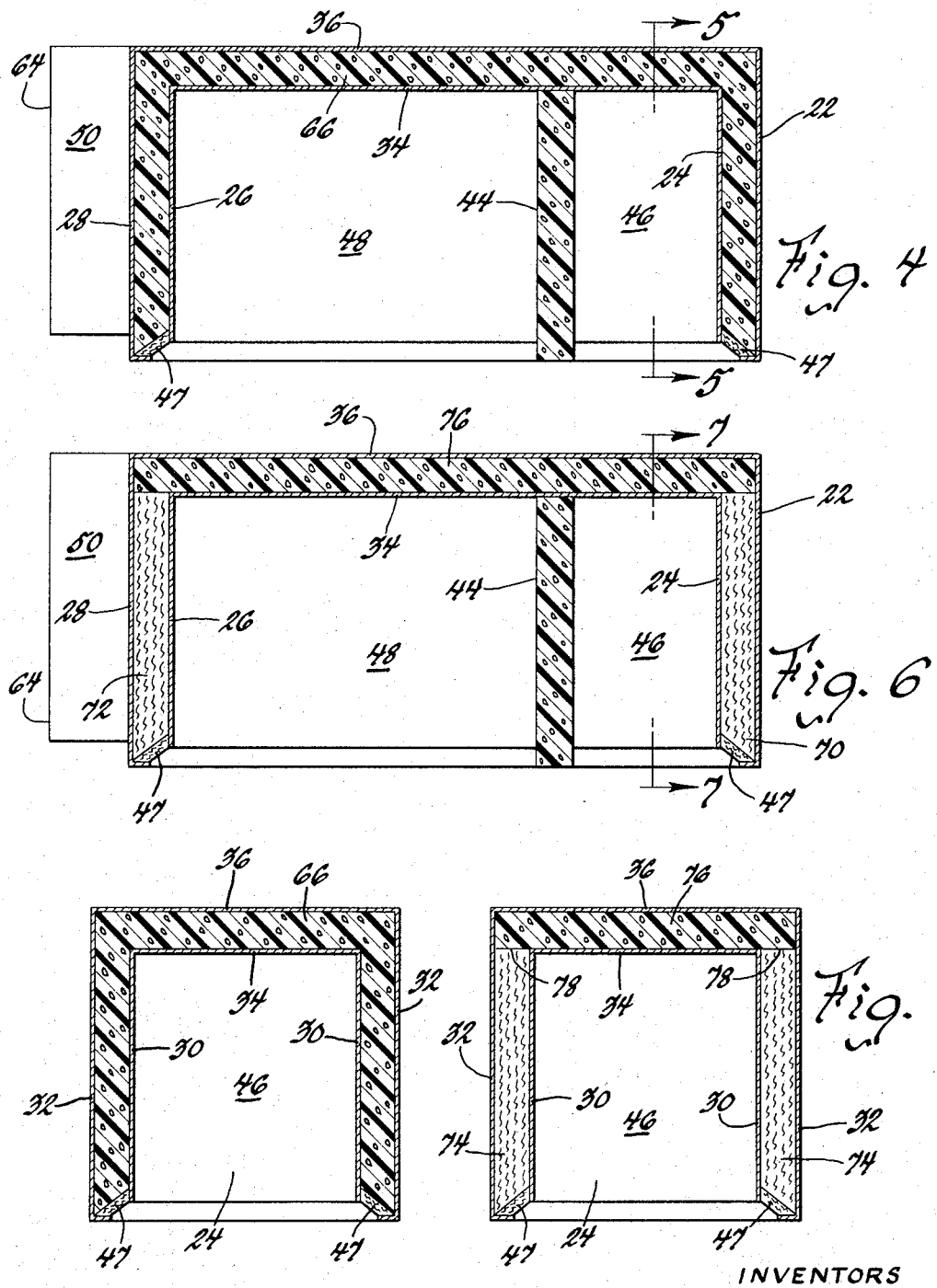

United States Patent Office 3,362,560
Patented Jan. 9, 1968

3,362,560
REFRIGERATING APPARATUS
Paul B. Burrus, Lebanon, and John C. Rill, Jr., Dayton, Ohio, assignors to General Motors Corporation, Detroit, Mich., a corporation of Delaware
Filed July 12, 1965, Ser. No. 471,307
1 Claim. (Cl. 220—9)

ABSTRACT OF THE DISCLOSURE

In the preferred form, the walls of the below freezing compartment are insulated with foamed in situ polyurethane foam while the remaining walls surrounding the above freezing compartment are insulated with glass fiber bats having their edges embedded in the adjacent edges of the polyurethane foam. In a second form, only the side and top walls are insulated with glass fiber insulation while the remaining walls are insulated with polyurethane foam.

This application pertains to refrigerating apparatus and more particularly to improved and lower cost insulation for refrigerator cabinets.

For many years glass fiber insulation was the standard insulation for refrigerator cabinets. More recently, polyurethane foamed with a volatile liquid was developed and has become more versatile, useful and lower in cost so that its material cost relative to its insulating value is now competitive with glass fiber insulation. However, the use of the polyurethane foam insulation has been impeded by the expansion pressures of the foam when it is cast in the insulation space. These pressures distort the walls of the space requiring the use of expensive, heavy jigs and fixtures to prevent this distortion. The glass fiber insulation has the objection that vibrations set up by shipping, handling and by the cooling apparatus, has a tendency to cause it to settle and leave voids.

It is an object of this invention to provide an insulating arrangement in which the use of both the glass fiber insulation and the foam insulation is combined in such a way to obtain economically the greatest benefit from the resilient, crushable, compressible properties of glass fiber insulation as well as the efficient, rigid, higher insulating values of foam insulation while avoiding substantially the tendency of the glass fiber to settle and the tendency of the foam to distort the visible finish walls of the insulation space during its initial casting.

It is another object of this invention to provide an insulation arrangement in which the foam insulation effectively and economically insulates the walls having the greatest temperature difference of an insulated refrigerator cabinet.

It is another object of this invntion to provide a method of insulating the refrigerator cabinet in which a layer of glass fiber is first placed in the insulation space and thereafter there is introduced into the remaining space an expandable foam forming material which expands into contact with the glass fiber and employing the glass fiber to absorb the expansion of the foam material to prevent the distortion of the walls and to use the foam material to support, and thereby prevent the glass fiber insulation from settling.

These and other objects are attained in the forms shown in the drawings in which the interior of the cabinet is divided into a below freezing compartment and an above freezing compartment by an insulating partition. The above freezing compartment has slabs of glass fiber insulation provided in the insulated space surrounding it. The temperature difference between the outside surface and the inside surface of the freezing compartment is considerably greater than the temperature difference between the outside surface and the inside surface of the walls of the above freezing compartment. Therefore, we first place slabs of glass fiber insulation in the insulation space on the back, sides and bottom of the lower above freezing compartment while foam forming insulation is applied to the top, sides and back of the below freezing compartment.

The foam forming material that penetrates the adjacent surface of the top of the glass fiber insulation in the sides and back of the below freezing compartment to make a firm connection therebetween to suspend the glass fiber insulation in such a way that it does not settle. The foam insulation adheres to the walls of the insulation space so that it is always properly supported and fixed therein. The foam also adheres very strongly to the glass fiber insulation and supports the upper surface thereof so that when the cabinet is placed in its normal upright position, the glass fiber insulation will be held in suspension by the foam insulation material to which it is attached so that no settling of the glass fiber insulation will result. The areas of the insulation space adjacent the below freezing compartment, occupied by the foam insulation are sufficiently limited in area that a minimum of distortion of the sheet metal outer walls will result.

In a second form of the invention the foam insulation is also provided upon the bottom wall of the cabinet where the greater heat beneath provides a greater temperature difference. In a third form of the invention the sides, top and bottom of the walls are all provided with glass fiber insulation. This is adhered to the foam insulation which extends over the entire back wall to provide superior insulation at this area which is also subject to greater temperature differences. In each of these forms the foam insulation provides a greater thermal barrier and serves to support the glass fiber insulation. The use of the foam insulation is limited to small areas and particularly to areas such as the back and bottom in which a limited distortion of walls is permissible since these are not finished walls and are not ordinarily in view when the cabinet is in normal use.

Further objects and advantages of the present invention will be apparent from the following description, reference being had to the accompanying drawings wherein preferred embodiments of the present invention are clearly shown.

In the drawings:

FIGURE 4 is a vertical sectional view similar to FIGURE 1, but modified to provide for the foaming of the remaining portion of the back wall as well as the bottom wall;

FIGURE 5 is a transverse sectional view taken along the line 5—5 of FIGURE 4;

FIGURE 6 is a vertical longitudinal sectional view similar to FIGURE 1 of another form of the invention in which only the back wall is provided with foam insulation; and FIGURE 7 is a vertical sectional view taken along the line 7—7 of FIGURE 6.

In the normal household refrigerator there is provided a freezing compartment which may for example be kept at temperatures between +11° F. and −2° F. There is also provided an above freezing compartment which is preferably kept at between about +35° and +38° F. In the 75° room, the temperature differential between the environmental air and interior of freezing compartment will be about 70°, whereas under the same conditions, the temperature differential between the environment air and the interior of the above freezing compartment will be about 40°. Therefore, if the insulation space is to be kept substantially uniform in thickness, it is desirable to provide superior insulation for the below freezing compartment. After it is introduced in the insulation space, the foam forming material expands and exerts a pressure against the walls of the insulation space. Heretofore, it has been customary to use heavy jigs and fixtures to support the walls to prevent the distortion during the forming of the foam and before the foam is polymerized into a solid state and cured. The glass fiber insulation has a tendency to settle when the cabinet is subjected to the vibrations due to shipping, handling and the operation of the compressors and leave voids at the top of the insulation space.

Figure 1:
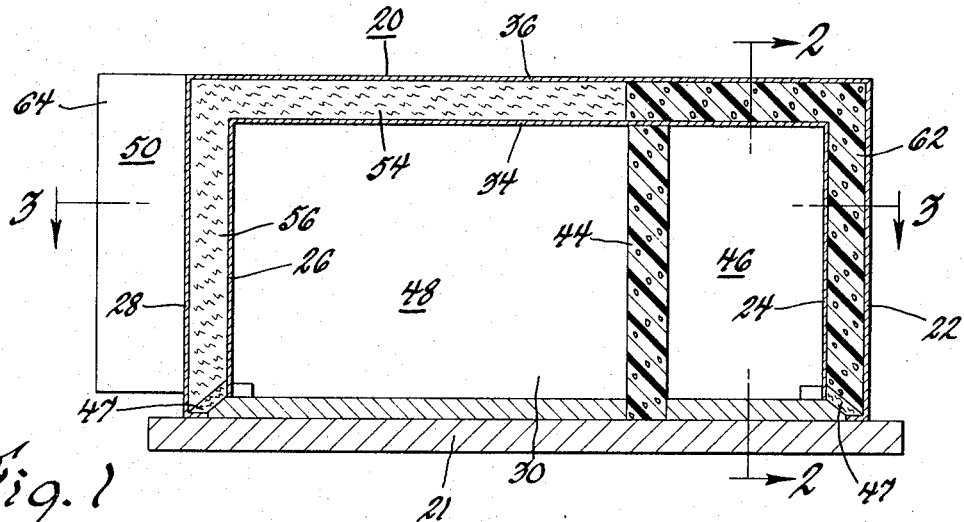
FIGURE 1 is a vertical sectional view taken along line 1—1 of FIGURES 2 and 3 of a refrigerator cabinet in the process of being filled with foam insulation and positioned face down upon a support for the foaming operation.

In FIGURE 1, mounted upon a platform 21 in a face down position is a refrigerator cabinet 20 having top outer and inner walls 22 and 24, bottom inner and outer walls 26 and 28, side inner and outer walls 30 and 32 and back inner and outer walls 34 and 36. The inner walls 24, 26, 30 and 34 are joined together to form an inner shell or liner, while the outer walls 22, 28, 32 and 36 are joined together with the walls of the machinery compartment at the bottom to form an outer shell. Slideably mounted within the inner liner is a partition wall 44 of insulating material which divides the interior of the cabinet into a below freezing compartment 46 and an above freezing compartment 48. The cabinet also includes a machinery compartment 50. In the normal position for usage of the cabinet the below freezing compartment 46 is at the top and the machinery compartment 50 is at the bottom. To insulate the cabinet the partition wall 44 is first inserted into the inner liner and guided or supported in its proper location by ribs upon the inner liner. The bats 52 of glass fiber insulation are placed within the lower sides of the outer shell against the side walls 32 and the bat 54 is placed against the back wall 36, while a bat of glass fiber insulation 56 is placed over the bottom wall 28 between the bottoms of the bats 52 and 54. The inner liner composed of the inner walls 24, 26, 30 and 34 is then inserted into the interior of the outer shell to better seal the front of the cabinet prior to forming, the space in between the front adjacent of the inner and outer shell is provided with strips of glass fiber insulation 47 or some suitable form of connecting breaker strip of poor heat conducting material which provides a connection between the front edge of the outer shell and the front edge of the inner liner. The cabinet is then placed face down upon the platform support 21.

The outer shell is located on the platform 21 by the beveled raised portion 38 which is of sufficient size to engage the inturned flange 40 at the front of the outer shell. The inner lines or inner shell is located relative to the outer shell by the projections 42. The remaining portions of the insulation space are filled by a foaming operation. The foaming operation may for example, be illustrated in Patent 3,137,744 issued June 16, 1964, or Patent 3,172,925 issued Mar. 9, 1965, or the froth forming process may be used as illustrated in the British Patent 975,080 published Nov. 11, 1964.

Figure 2:
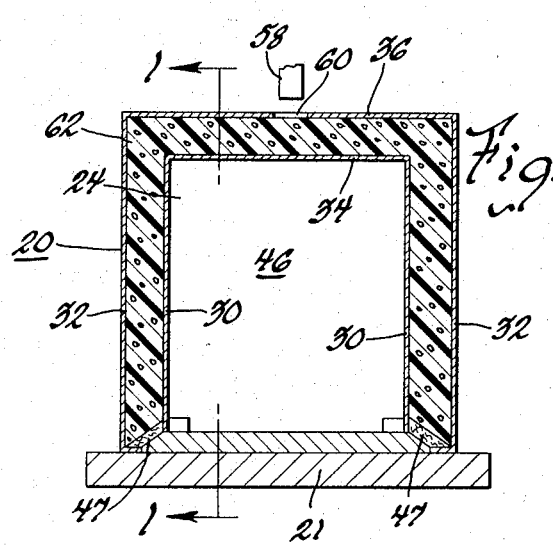
FIGURE 2 is a transverse vertical sectional view taken along line 2—2 of FIGURE 1.

The process disclosed in the British patent is particularly suitable since the polyurethane foam resin material provided by that process exerts a lesser pressure on the walls of the insulation space than the conventional type of polyurethane foam expansion. As indicated diagrammatically in FIGURE 2, the foam forming materials issue from a nozzle 58 and flow through an opening 60 in the back wall and into the space between the inner and outer shells. In this space, the foam forming material foam and expand to fill substantially all the spaces without exerting a sufficient pressure on the adjacent portions of the top and side walls to cause any substantial visible distortion.

Figure 8:
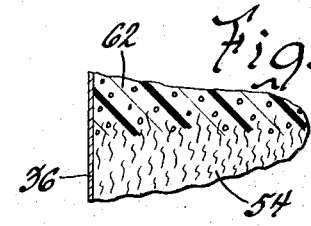

As better indicated in FIGURE 8, the foam resin 62 form in this process penetrates the adjacent surface of the glass fiber insulation such as the bat 54 formed in the rear wall and the bats 52 provided in the side walls. This causes the upper surface of the bats of glass fiber insulation to be firmly joined to the remaining foam insulation. Since the foam insulation adheres to the walls of the insulation space and also to the upper surfaces of the bats 52 and 54, the foam will support the top of the glass fiber insulation and hold the glass fiber insulation in suspension to and prevent it from settling so that there will not be voids adjacent the top of these bats 52 and 54. Thus, when the cabinet is turned upright and rests on the bottom supports 64, the joint between the foam and the top of the bats 52 and 54 will support the top of the glass fiber insulation and hold it in suspension to and prevent it from settling.

Figure 3:
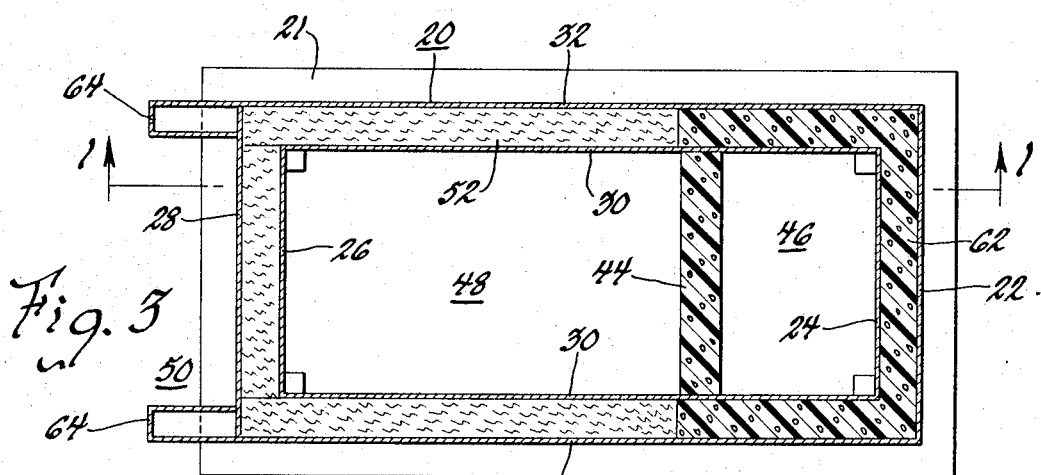
FIGURE 3 is a horizontal sectional view taken along the line 3—3 of FIGURE 1.

The form shown in FIGURE 4 is similar to the form shown in FIGURES 1, 3, and 8. The same reference characters are retained for the inner and outer shells and remaining parts of the cabinet excepting for the insulation. The insulation in the sides of the cabinet is the same and has the bats 52 in the side walls. This form differs in that the foam insulation 66 extends to the insulation space between the bottom walls 26 and 28 as well as the entire insulation space between the back walls 34 and 36. The side walls are the same as in FIGURES 1 and 3. This arrangement provides a superior form insulation 66 at the back where the hot air from the machinery compartment flowing upwardly along the back wall 36 normally provides higher temperatures, resulting in a greater temperature difference between this air at the back of the cabinet and the air within the above freezing compartment 48 thereof. This modified form of cabinet therefore has improved insulating properties provided for the above freezing compartment. Since the bottom wall 28 is not exposed and its appearance not critical, there is no need for any more fixtures than is required for the form shown in FIGURES 1 and 3.

In FIGURES 6 and 7 there is shown a third form of the invention in which all parts of the cabinet are provided with the same reference characteristics as in FIGURES 1 and 3 excepting the insulation. In FIGURES 6 and 7 bats of fiber glass insulation 70 and 72 are provided in the top and bottom walls while the bats 74 are provided in the side walls. However, in this form, the entire back wall is provided with foam insulation 76. In this form, the fiber glass insulation on the top and sides of the cabinet eliminates any need for the use of fixtures since these are the only walls normally visible from the exterior. The foam insulation 76 in the entire back wall has superior insulating qualities where there are greater temperature differentials than the side walls are subject to. The foam forming materials penetrate the adjacent surfaces of the bats 74 at their meeting point 78 as indicated in FIGURE 7 and therefore aid in preventing the settling of these bats. The foam insulation may be of any of the types and may be applied by any of the methods disclosed in the patents previously mentioned.

FIGURE 8 is an enlarged fragmentary sectional view of the joint between the glass fiber and the foam insulation as shown in FIGURE 3.

While the embodiments of the present invention as herein disclosed, constitute a preferred form, it is to be understood that other forms might be adopted.

What is claimed is as follows:

1. A refrigerator including a cabinet having top and bottom and side and back inner and outer walls spaced from each other to provide an insulating space therebetween, resilient fibrous insulating material extending between substantially all of said side and top walls, and organic resin foam insulation within said insulation space adhering to and filling major portions between the rear walls and adhering to and supporting adjacent portions of said resilient fibrous insulating materials for preventing movement of said fibrous insulating material.

References Cited
UNITED STATES PATENTS

| | | | |
|---|---|---|---|
| 2,481,664 | 9/1949 | Hemp | 220—15 |
| 2,728,702 | 12/1955 | Simon et al. | 220—9 |
| 2,916,179 | 12/1959 | Monroe | 220—15 |
| 2,962,183 | 11/1960 | Rill et al. | 220—9 |
| 3,155,266 | 11/1964 | Yamamoto | 220—15 |
| 3,174,642 | 3/1965 | Lowenthal et al. | 220—9 |
| 3,240,029 | 3/1966 | Wurtz | 220—9 |
| 3,294,462 | 12/1966 | Kesling | 220—9 |

THERON E. CONDON, *Primary Examiner.*

J. R. GARRETT, *Assistant Examiner.*